(12) United States Patent
Fujishiro

(10) Patent No.: US 11,445,416 B2
(45) Date of Patent: Sep. 13, 2022

(54) CELL RESELECTION CONTROL METHOD, BASE STATION, AND RADIO TERMINAL

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/760,038

(22) PCT Filed: Nov. 19, 2018

(86) PCT No.: PCT/JP2018/042674
§ 371 (c)(1),
(2) Date: Apr. 29, 2020

(87) PCT Pub. No.: WO2019/102964
PCT Pub. Date: May 31, 2019

(65) Prior Publication Data
US 2020/0351727 A1    Nov. 5, 2020

(30) Foreign Application Priority Data
Nov. 21, 2017 (JP) .............................. JP2017-223366

(51) Int. Cl.
*H04W 36/00* (2009.01)
*H04W 36/36* (2009.01)
(Continued)

(52) U.S. Cl.
CPC ... *H04W 36/0072* (2013.01); *H04W 36/0079* (2018.08); *H04W 36/00837* (2018.08);
(Continued)

(58) Field of Classification Search
CPC ......... H04W 36/0072; H04W 36/0079; H04W 36/00837; H04W 36/36; H04W 36/38;
(Continued)

(56) References Cited

U.S. PATENT DOCUMENTS 10,728,811 B2 *   7/2020  Kim ................. H04W 36/0094
2010/0202307 A1 * 8/2010  Lee ................... H04W 36/0088
                                                          370/252
(Continued)

FOREIGN PATENT DOCUMENTS

| JP | 2016513380 A | 5/2016 |
| WO | 2016072502 A1 | 5/2016 |
| WO | 2016186044 A1 | 11/2016 |

*Primary Examiner* — Asghar H Bilgrami
(74) *Attorney, Agent, or Firm* — Studebaker & Brackett PC

(57) ABSTRACT

A cell reselection control method comprises transmitting from a base station configured to manage a cell belonging to a first frequency, to a radio terminal selecting the cell as a serving cell while being in an idle mode, an intra-frequency redistribution parameter for redistributing the radio terminal to another cell belonging to the first frequency, and an inter-frequency redistribution parameter for redistributing the radio terminal to a second frequency different from the first frequency, receiving, by the radio terminal, the intra-frequency redistribution parameter and the inter-frequency redistribution parameter, and selecting, by the radio terminal, a redistribution target by using at least one of the intra-frequency redistribution parameter and the inter-frequency redistribution parameter, the redistribution target being a frequency or a cell provided with highest priority for cell reselection.

5 Claims, 12 Drawing Sheets

(51) Int. Cl.
*H04W 36/38* (2009.01)
*H04W 48/00* (2009.01)
*H04W 48/10* (2009.01)
*H04W 48/12* (2009.01)
*H04W 48/18* (2009.01)
*H04W 16/08* (2009.01)
*H04W 16/32* (2009.01)
*G16Y 10/75* (2020.01)

(52) U.S. Cl.
CPC .......... *H04W 36/36* (2013.01); *H04W 36/38* (2013.01); *G16Y 10/75* (2020.01)

(58) Field of Classification Search
CPC . H04W 36/0087; H04W 48/00; H04W 48/19; H04W 48/12; H04W 48/18; H04W 16/08; H04W 16/32; H04W 36/00873; H04W 48/10; G16Y 10/75
See application file for complete search history.

(56) References Cited

U.S. PATENT DOCUMENTS

| | | | |
|---|---|---|---|
| 2010/0222055 A1* | 9/2010 | Cho | H04W 36/0085 455/434 |
| 2015/0327144 A1* | 11/2015 | Dalsgaard | H04W 36/30 370/252 |
| 2017/0034751 A1* | 2/2017 | Fujishiro | H04W 48/18 |
| 2017/0164250 A1* | 6/2017 | Kim | H04W 88/02 |
| 2018/0152924 A1* | 5/2018 | Ouchi | H04W 72/042 |
| 2018/0220344 A1* | 8/2018 | Shaheen | H04W 4/60 |
| 2019/0208505 A1* | 7/2019 | Park | H04W 72/0446 |
| 2020/0314713 A1* | 10/2020 | Jung | H04W 76/27 |
| 2020/0322861 A1* | 10/2020 | Ozturk | H04W 36/08 |

\* cited by examiner

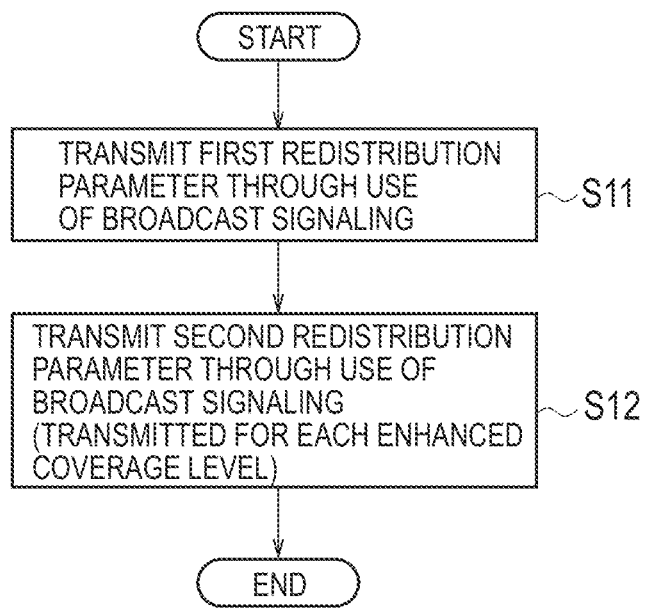

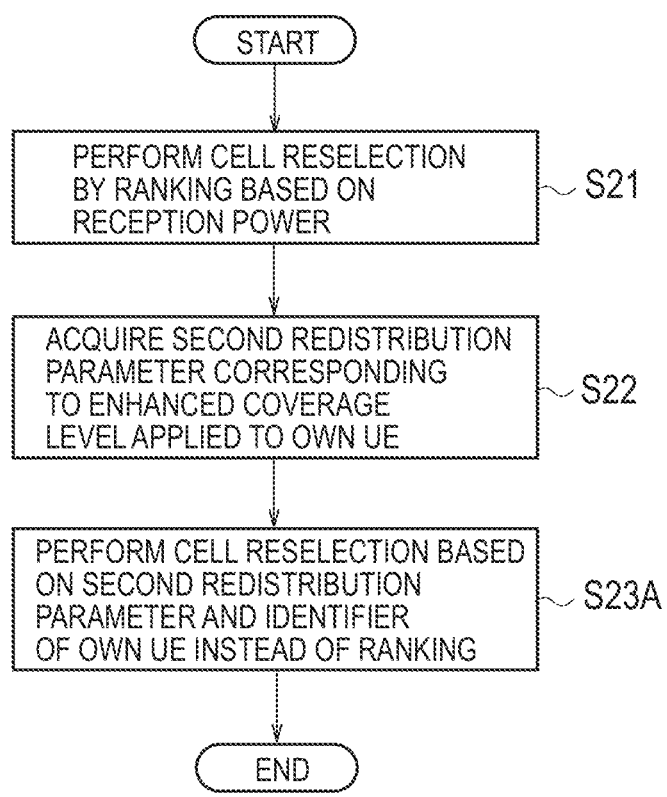

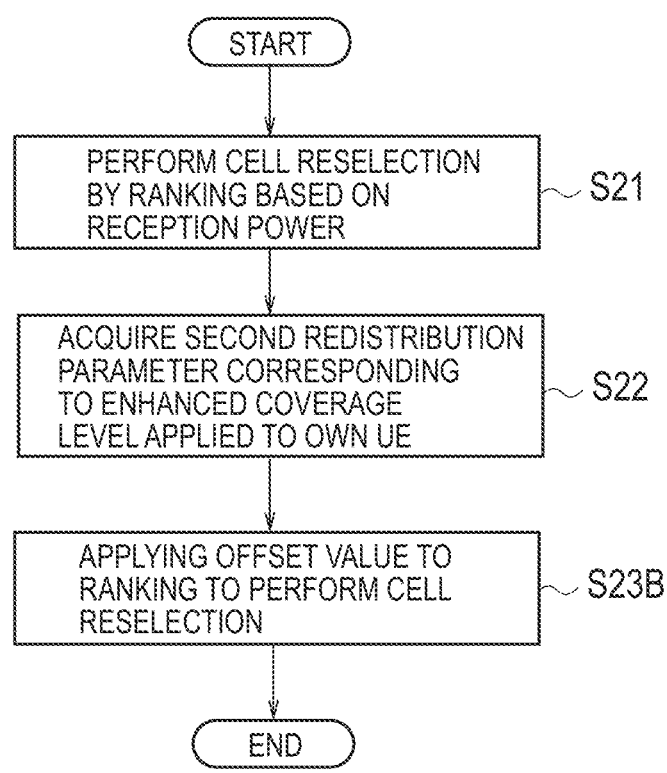

CELL RESELECTION CONTROL METHOD, BASE STATION, AND RADIO TERMINAL

RELATED APPLICATIONS

The present application is a National Phase of International Application No. PCT/JP2018/042674, filed Nov. 19, 2018, and claims priority based on Japanese Patent Application No. 2017-223366, filed Nov. 21, 2017.

TECHNICAL FIELD

The present invention relates to a cell reselection control method, a base station, and a radio terminal in a mobile communication system.

BACKGROUND ART

In recent years, radio terminals for machine type communication (MTC) and Internet of Things (IoT) services that perform communication without human intervention have attracted attention. Such a radio terminal is required to realize cost reduction, coverage extension, and low power consumption. For this reason, in the 3rd Generation Partnership Project (3GPP), a new category of radio terminals has been specified in which the transmission/reception bandwidth is limited to only part of the system transmission/reception band. An enhanced coverage function including repetitive transmissions (repetition) and the like is applied to the new category of radio terminals includes.

SUMMARY OF INVENTION

A cell reselection control method according to an embodiment is used in a mobile communication system. The cell reselection control method comprises transmitting from a base station configured to manage a cell belonging to a first frequency, to a radio terminal selecting the cell as a serving cell while being in an idle mode, an intra-frequency redistribution parameter for redistributing the radio terminal to another cell belonging to the first frequency, and an inter-frequency redistribution parameter for redistributing the radio terminal to a second frequency different from the first frequency, receiving, by the radio terminal, the intra-frequency redistribution parameter and the inter-frequency redistribution parameter, and selecting, by the radio terminal, a redistribution target by using at least one of the intra-frequency redistribution parameter and the inter-frequency redistribution parameter, the redistribution target being a frequency or a cell provided with highest priority for cell reselection.

A base station according to an embodiment is used in a mobile communication system. The base station comprises a controller configured to manage a cell belonging to a first frequency, and a transmitter configured to transmit, to a radio terminal selecting the cell as a serving cell while being in an idle mode, an intra-frequency redistribution parameter and an inter-frequency redistribution parameter. The intra-frequency redistribution parameter is a parameter for redistributing the radio terminal to another cell belonging to the first frequency. The inter-frequency redistribution parameter is a parameter for redistributing the radio terminal to a second frequency different from the first frequency.

A radio terminal according to an embodiment is used in a mobile communication system. The radio terminal comprises a receiver configured to receive, from a base station configured to manage a cell belonging to a first frequency, an intra-frequency redistribution parameter and an inter-frequency redistribution parameter when the radio terminal is selecting the cell as a serving cell while being in an idle mode, and a controller configured to select a redistribution target by using at least one of the intra-frequency redistribution parameter and the inter-frequency redistribution parameter, the redistribution target being a frequency or a cell provided with highest priority for cell reselection. The intra-frequency redistribution parameter is a parameter for redistributing the radio terminal to another cell belonging to the first frequency. The inter-frequency redistribution parameter is a parameter for redistributing the radio terminal to a second frequency different from the first frequency.

BRIEF DESCRIPTION OF DRAWINGS

FIG. 8 is a diagram illustrating an operation of the eNB according to a first embodiment.

FIG. 9 is a diagram illustrating a configuration example of a second redistribution parameter according to the first embodiment.

FIG. 10 is a diagram illustrating an operation of a UE existing in a second coverage according to the first embodiment.

FIG. 11 is a diagram illustrating an operation of a UE according to a first modification of the first embodiment.

DESCRIPTION OF EMBODIMENTS

First Embodiment

Outline of First Embodiment

A redistribution function for distributing cells and/or frequencies that are reselected by a plurality of radio terminals in an idle mode by cell reselection is known. Specifically, the base station transmits a redistribution parameter used for the redistribution function through the use of broadcast signaling. The radio terminal in the idle mode acquires the redistribution parameter, and performs cell reselection based on the acquired redistribution parameter.

Such a redistribution function is assumed to be applied to a radio terminal in a coverage (first coverage) that is not extended by the enhanced coverage function. However, the enhanced coverage function increases the cell load due to repetitive transmissions, etc., so that it is desired that the redistribution function can be applied to a radio terminal in a coverage (second coverage) extended by the enhanced coverage function.

Therefore, the first embodiment provides cell reselection control that enables the radio terminals in the idle mode in the coverage extended by the enhanced coverage function to be appropriately distributed to a plurality of cells and/or frequencies by the cell reselection.

A method of controlling a cell reselection according to the first embodiment is a method in a mobile communication system. The method of controlling the cell reselection includes a step A in which a base station transmits, as a redistribution parameter used for a redistribution function, a first redistribution parameter applied to a radio terminal in a first coverage and a second redistribution parameter applied to a radio terminal in a second coverage outside the first coverage through a use of broadcast signaling, a step B in which a radio terminal in an idle mode in the second coverage acquires the second redistribution parameter transmitted in the step A, and a step C in which the radio terminal performs cell reselection using the second redistribution parameter acquired in the step B. The redistribution function is a function of distributing cells and/or frequencies that a plurality of radio terminals in an idle mode reselects by cell reselection. The second coverage is a coverage extended by an enhanced coverage function including repetitive transmissions.

According to such a method of controlling the cell reselection, the redistribution function can also be applied to a radio terminal in the coverage (second coverage) extended by the enhanced coverage function. In addition, since it is possible to apply individual redistribution parameters to the radio terminal in the first coverage and the radio terminal in the second coverage, the cells and/or frequencies to be reselected by the radio terminal in the second coverage by cell reselection can be appropriately distributed.

(Mobile Communication System)

Figure 1:
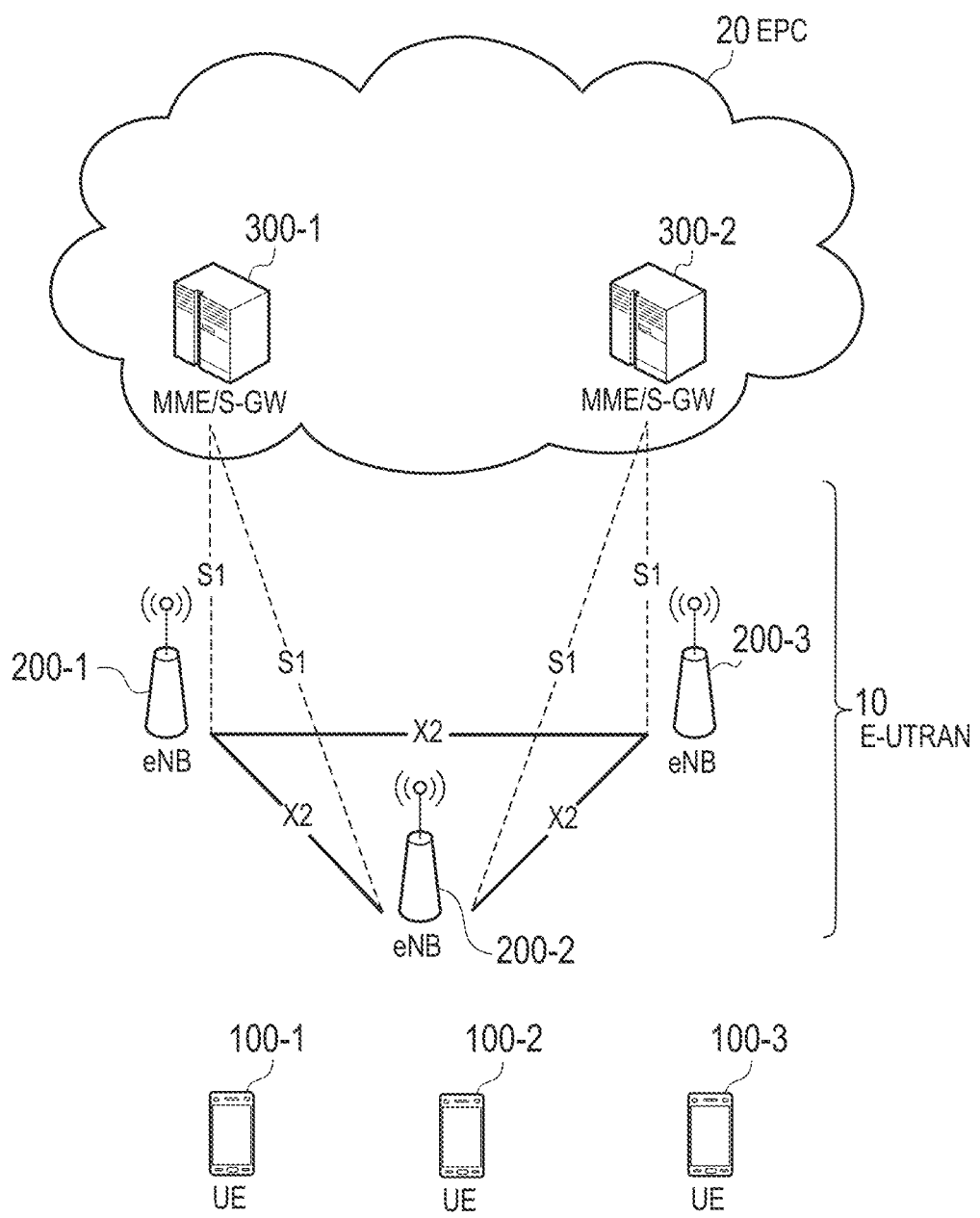
FIG. 1 is a diagram illustrating a configuration of an LTE system (mobile communication system) according to an embodiment.

A configuration of the mobile communication system according to the first embodiment will be described. FIG. 1 is a diagram illustrating a configuration of a long-term evolution (LTE) system that is a mobile communication system according to the first embodiment. The LTE system is a mobile communication system based on the 3GPP standard.

The LTE system includes a radio terminal (UE: User Equipment) 100, a radio access network (E-UTRAN: Evolved-UMTS Terrestrial Radio Access Network) 10, and a core network (EPC: Evolved Packet Core) 20.

The UE 100 is a mobile communication apparatus. The UE 100 performs radio communication with an eNB 200 that manages a cell (serving cell) in which the UE 100 exists.

The E-UTRAN 10 includes the base station (eNB: evolved Node-B) 200. The eNB 200 is connected to each other via an X2 interface. The eNB 200 manages one or a plurality of cells. The eNB 200 performs radio communication with UE 100 which establishes the connection with the own cell. The eNB 200 has a radio resource management (RRM) function, a routing function of user data (hereinafter simply referred to as "data"), a measurement control function for mobility control/scheduling, and the like. "Cell" is used as a term indicating a minimum unit of a radio communication area. "Cell" is also used as a term indicating a function or resource for performing radio communication with UE 100. One cell belongs to one carrier frequency.

The EPC 20 includes a mobility management entity (MME) and a serving gateway (S-GW) 300. The MME performs various types of mobility control etc. with respect to the UE 100. The MME manages tracking area (TA) information in which UE 100 exists by communicating with UE 100 using a non-access stratum (NAS) signaling. The tracking area is an area composed of a plurality of cells. The S-GW performs data transfer control. The MME and the S-GW are connected to the eNB 200 via an S1 interface.

Figure 2:
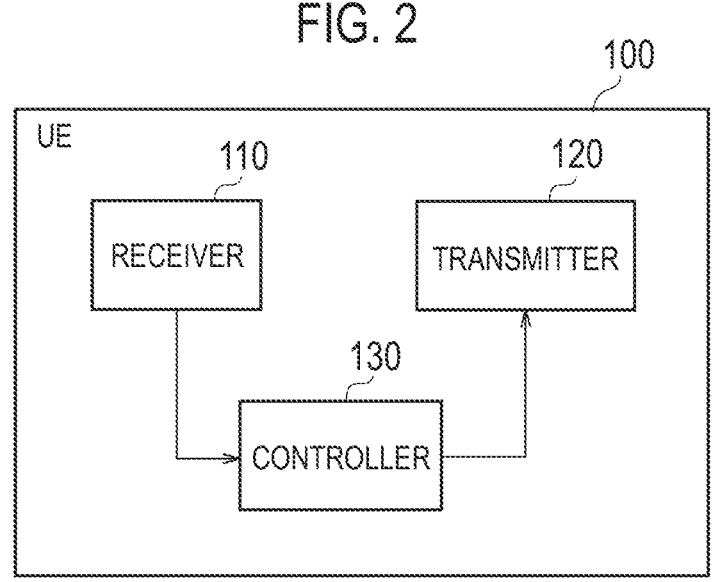
FIG. 2 is a diagram illustrating a configuration of a UE (radio terminal) according to the embodiment.

FIG. 2 is a diagram illustrating a configuration of the UE 100 (radio terminal). The UE 100 includes a receiver 110, a transmitter 120, and a controller 130.

The receiver 110 performs various types of reception under the control of the controller 130. The receiver 110 includes an antenna and a receiving device. The receiving device converts a radio signal received by the antenna into a baseband signal (reception signal) and outputs it to the controller 130.

The transmitter 120 performs various types of transmission under the control of the controller 130. The transmitter 120 includes an antenna and a transmission device. The transmission device converts a baseband signal (transmission signal) output by the controller 130 into a radio signal and transmits it from the antenna.

The controller 130 performs various types of control in the UE 100. The controller 130 includes at least one processor and at least one memory. The memory stores a program executed by the processor and information used for processing by the processor. The processor may include a baseband processor and a central processing unit (CPU). The baseband processor performs modulation/demodulation and encoding/decoding of the baseband signal. The CPU executes programs stored in the memory to perform various processes. The processor executes processing to be described later.

Figure 3:
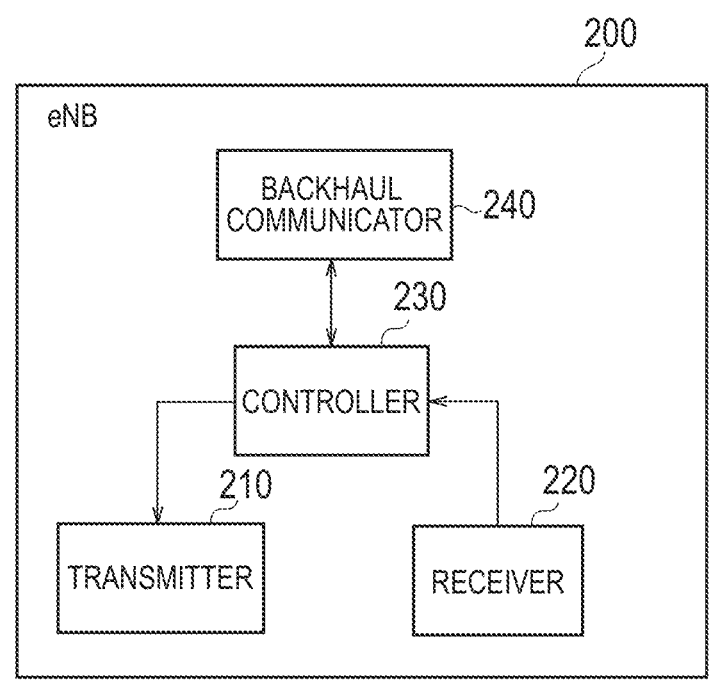
FIG. 3 is a diagram illustrating a configuration of an eNB (base station) according to the embodiment.

FIG. 3 is a diagram illustrating a configuration of the eNB 200 (base station). The eNB 200 includes a transmitter 210, a receiver 220, a controller 230, and a backhaul communicator 240.

The transmitter 210 performs various types of transmissions under the control of the controller 230. The transmitter 210 includes an antenna and a transmission device. The transmission device converts the baseband signal (transmission signal) output by the controller 230 into a radio signal and transmits it from the antenna.

The receiver 220 performs various types of reception under the control of the controller 230. The receiver 220 includes an antenna and a receiving device. The receiving device converts a radio signal received by the antenna into a baseband signal (reception signal) and outputs it to the controller 230.

The controller 230 performs various types of controls in the eNB 200. The controller 230 includes at least one processor and at least one memory. The memory stores a program executed by the processor and information used for processing by the processor. The processor may include a baseband processor and a CPU. The baseband processor performs modulation/demodulation and encoding/decoding of the baseband signal. The CPU executes programs stored in the memory to perform various processes. The processor executes processing to be described later.

The backhaul communicator 240 is connected to the adjacent eNB via the X2 interface. The backhaul communicator 240 is connected to the MME/S-GW 300 via the S1 interface. The backhaul communicator 240 is used for communication performed on the X2 interface, communication performed on the S1 interface, and the like.

Figure 4:
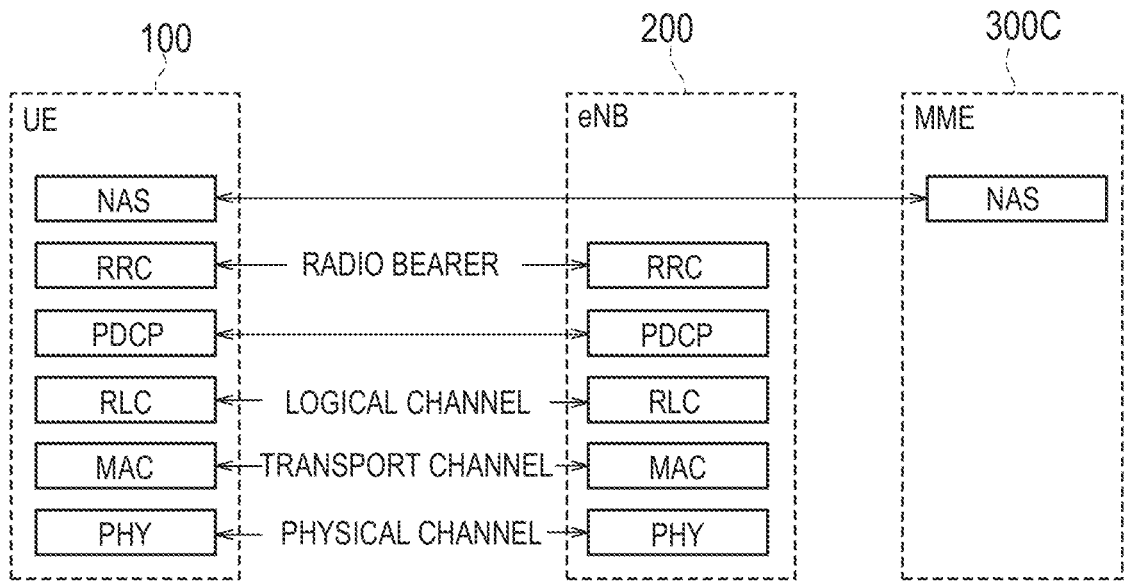
FIG. 4 is a diagram illustrating a protocol stack of a radio interface in the LTE system according to the embodiment.

FIG. 4 is a diagram illustrating a configuration of a protocol stack of a radio interface in the LTE system. As illustrated in FIG. 4, the radio interface protocol is divided into a first layer to a third layer of an OSI reference model. The first layer is a physical (PHY) layer. The second layer includes a medium access regulation (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs encoding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs data priority control, retransmission processing by hybrid ARQ (HARQ), random access procedure, and the like. Data and control information are transmitted between the MAC layer of the UE 100 and the MAC layer of the eNB 200 via a transport channel. The MAC layer of eNB 200 includes a scheduler. The scheduler determines an uplink/downlink transport format (transport block size, modulation/coding scheme (MCS)) and a resource block allocated to the UE 100.

The RLC layer transmits data to the RLC layer on the receiving side using the functions of the MAC layer and the PHY layer. Between the RLC layer of UE 100 and the RLC layer of eNB 200, data and control information are transmitted via a logical channel.

The PDCP layer performs header compression/decompression and encryption/decryption.

The RRC layer is defined only in the control plane that handles control information. The RRC signaling for various settings is transmitted between the RRC layer of the UE 100 and the RRC layer of the eNB 200. The RRC layer controls a logical channel, a transport channel, and a physical channel according to establishment, re-establishment, and release of a radio bearer. When there is a connection (RRC connection) between the RRC of the UE 100 and the RRC of the eNB 200, the UE 100 is in the RRC connected mode. When there is no connection (RRC connection) between the RRC of the UE 100 and the RRC of the eNB 200, the UE 100 is in the RRC idle mode.

An NAS layer located above the RRC layer performs session management, mobility management and the like. NAS signaling is transmitted between the NAS layer of UE 100 and the NAS layer of an MME 300C. The UE 100 has functions such as an application layer in addition to the radio interface protocol.

Figure 5:
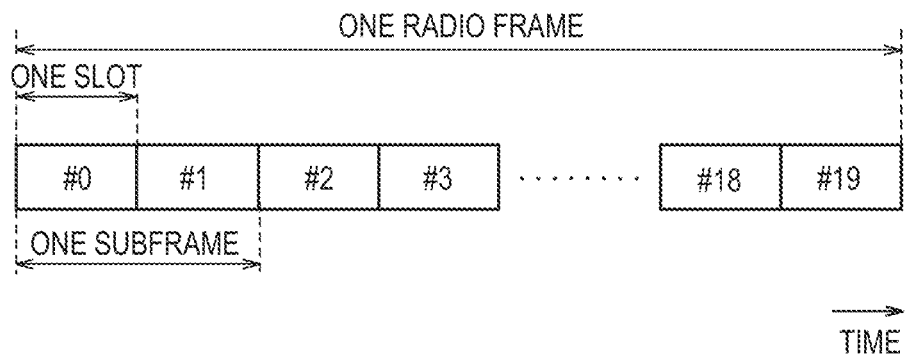
FIG. 5 is a diagram illustrating a configuration of a radio frame of the LTE system according to the embodiment.

FIG. 5 is a diagram illustrating a configuration of a radio frame used in the LTE system. The radio frame is composed of 10 subframes on the time axis. Each subframe is composed of two slots on the time axis. The length of each subframe is 1 ms. The length of each slot is 0.5 ms. Each subframe includes a plurality of resource blocks (RB) on the frequency axis. Each subframe includes a plurality of symbols on the time axis. Each resource block includes a plurality of subcarriers on the frequency axis. Specifically, one RB is configured by 12 subcarriers and one slot. One resource element (RE) is configured by one symbol and one subcarrier. Of the radio resources (time/frequency resources) allocated to UE 100, the frequency resource can be specified by the resource block, and the time resource can be specified by the subframe (or slot).

In the downlink, the section of the first few symbols of each subframe is an area used as a physical downlink control channel (PDCCH) for mainly transmitting downlink control information. The remaining part of each subframe is an area that can be used as a physical downlink shared channel (PDSCH) for mainly transmitting downlink data.

In the uplink, both ends of each subframe in the frequency direction are areas used as a physical uplink control channel (PUCCH) for mainly transmitting uplink control information. The remaining part of each subframe is an area that can be used as a physical uplink shared channel (PUSCH) for mainly transmitting uplink data.

(Outline of Cell Reselection)

The outline of the cell reselection operation will be described. When the start condition is satisfied the UE 100 in the idle mode (RRC idle mode) measures the quality of the adjacent cell adjacent to the current serving cell, and selects a cell to be used as a serving cell from cells satisfying the selection condition.

First, the start conditions are as indicated below.

(A1) A frequency having a priority higher than the priority of the frequency of the current serving cell:

The UE 100 always measures the quality of a frequency having a high priority.

(A2) A frequency having a priority equal to or lower than the priority of the frequency of the current serving cell:

The UE 100 measures the quality of frequencies having an equal or a lower priority when the quality of the current serving cell falls below a predetermined threshold value.

Secondly, the selection conditions are indicated as follows.

(B1) The priority of the adjacent cell frequency is higher than the priority of the current serving cell:

The UE 100 selects a cell that satisfies the relationship of Squal>ThreshX,HighQ over a predetermined period (TreselectionRAT) or a cell that satisfies the relationship of Srxlev>ThreshX,HighP over a predetermined period (TreselectionRAT). In such a case, the criterion that the adjacent cell should satisfy may be referred to as an "S-criteria".

Squal represents the cell selection quality level. The Squal is calculated by Squal=Qqualmeas−(Qqualmin+Qqualminoffset)−Qoffsettemp. Qqualmeas is the quality level (RSRQ) of the adjacent cell. Qqualmin is the minimum required quality level. Qqualminoffset is a predetermined offset that is constantly applied to the adjacent cell. Qoffsettemp is an offset temporarily applied to the adjacent cell. ThreshX,HighQ is predetermined threshold value.

Srxlev represents cell selection reception power. Srxlev is calculated by Srxlev=Qrxlevmeas−(Qrxlevmin+Qrxlevminoffset)−Pcompensation−Qoffsettemp. Qrxlevmeas is the reception power (RSRP) of the adjacent cell. Qrxlevmin is the minimum required reception power. Qrxlevminoffset is a predetermined offset that is constantly applied to the adjacent cell. Pcompensation is a parameter related to uplink capability. Qoffsettemp is an offset temporarily applied to the adjacent cell. ThreshX,HighP is a predetermined threshold value.

(B2) The frequency priority of the adjacent cell is the same as the priority of the current serving cell:

The UE 100 calculates the ranking Rs of the current serving cell and the ranking Rn of the adjacent cell. The UE 100 selects, as a target cell, a cell having the ranking Rn higher than the Rs over a predetermined period (TreselectionRAT). In such a case, the criterion to be satisfied by the adjacent cell may be referred to as an "R-criteria".

The Rs is calculated by Rs=Qmeas,s+QHyst−Qoffsettemp. Rn is calculated by Rn=Qmeas,n−Qoffset−Qoffsettemp. Qmeas,s is the reception power (RSRP) of the current serving cell. Qmeas,n is the reception power (RSRP)

of the adjacent cell. QHyst is a hysteresis value for facilitating reselection of the current serving cell as the target cell. Qoffsettemp is an offset that is temporarily applied to the current serving cell and the adjacent cell.

(B3) The priority of the frequency of the adjacent cell is lower than the priority of the current serving cell:

Under the premise that Squal<ThreshServing,LowQ is satisfied over the predetermined period (TreselectionRAT), or Srxlev<ThreshServing,LowP is satisfied over the predetermined period (TreselectionRAT), the UE 100 selects a target cell from adjacent cells by the same method as in (B1) described above.

However, ThreshServing,LowQ, and ThreshServing,LowP are predetermined threshold values, as in ThreshX,HighQ, and ThreshX,HighP.

Various parameters used in selecting the target cell are included in information (SIB: System Information Block) broadcast from the eNB 200. The various parameters include the frequency priority (cellReselectionPriority), the predetermined period (TreselectionRAT), the various offsets (Qqualminoffset, Qrxlevminoffset, Qoffsettemp, QHyst, and Qoffset), and the various threshold values (ThreshX,HighQ, ThreshX,HighP, ThreshServing,LowQ, and ThreshServing,LowP).

(Outline of Redistribution Function)

The LTE system according to the first embodiment has a redistribution function. The redistribution function is a function of distributing cells and/or frequencies reselected by a plurality of UEs in an idle mode through cell reselection. In particular, in the redistribution function, the UE 100 selects a redistribution target (frequency or cell) based on redistribution parameters transmitted from eNB 200 through the use of broadcast signaling (e.g. SIB). For example, the UE 100 performs cell reselection of another frequency (inter-frequency) for the redistribution target.

The UE 100 is redistributed to the redistribution target (frequency or cell), and is regarded to have the highest priority (that is, higher than the priority of any network configuration) in the redistributed redistribution target for a certain period (that is, validity timer). The network configuration priority is, for example, a frequency priority (cellReselectionPriority) included in the SIB. Such redistribution can be triggered by paging. A certain period (validity timer) is referred to as T360. When redistribution is not triggered by paging, the UE 100 performs a redistribution operation periodically (that is, every time T360 expires).

According to the redistribution function in a situation where a plurality of UEs 100 in the idle mode is concentrated on a specific cell or a specific frequency, the plurality of UEs 100 can be redistributed to another cell (of another frequency). Therefore, it is possible to avoid the concentration of the load on a specific cell or a specific frequency.

(Outline of eMTC and NB-IoT)

The outline of eMTC and NB-IoT will be described. In the first embodiment, a scenario is assumed in which there is a new category of the UE 100 for MTC and IoT services. The new category of the UE 100 is a UE 100 whose transmission/reception bandwidth is limited to only part of the system transmission/reception band (LTE transmission/reception bandwidth). The new UE category is referred to as, for example, a category M1 and a category NB (Narrow Band)-IoT. The category M1 is a category to which an enhanced machine type communications (eMTC) UE belongs. The category NB-IoT (category NB1) is a category to which the NB-IoT UE belongs. The category M1 restricts the transmission/reception bandwidth of the UE 100 (eMTC UE) to, for example, 1.08 MHz (that is, the bandwidth of 6 resource blocks). The category NB-IoT (category NB1) further restricts the transmission/reception bandwidth of UE 100 (NB-IoT UE) to 180 kHz (that is, the bandwidth of one resource block). By narrowing the bandwidth, it is possible to realize cost reduction and low power consumption required for the eMTC UE and the NB-IoT UE.

Figure 6:
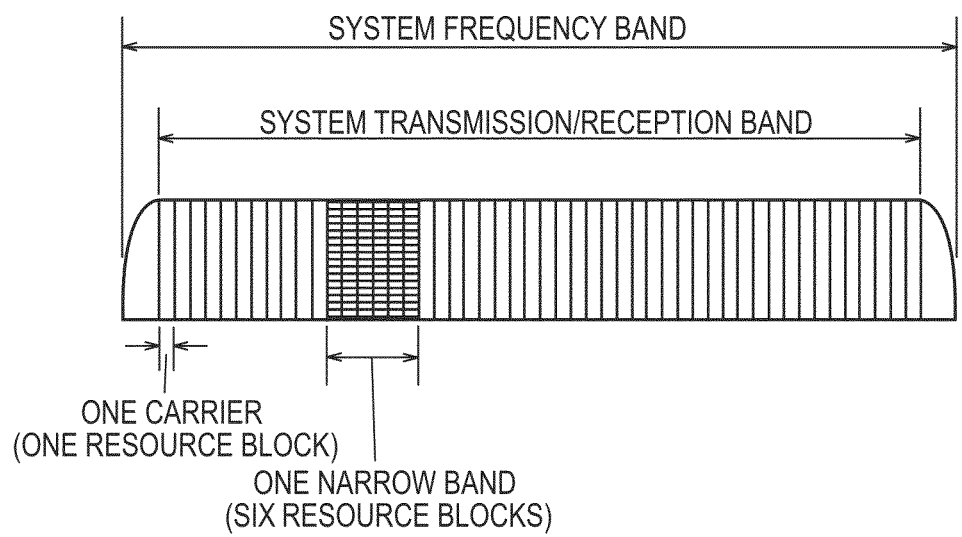
FIG. 6 is a diagram illustrating frequency channels handled by an eMTC UE and an NB-IoT UE.

FIG. 6 is a diagram illustrating frequency channels handled by the eMTC UE and the NB-IoT UE. As illustrated in FIG. 6, the frequency bandwidth of the system frequency band of the LTE system may be 10 MHz. The bandwidth of the system transmission/reception band is, for example, 50 resource blocks=9 MHz. The bandwidth of the frequency channel that can be supported by the eMTC UE is within 6 resource blocks=1.08 MHz. A frequency channel within 6 resource blocks that can be supported by the eMTC UE is referred to as a "narrow band (NB)". The bandwidth of the frequency channel that can be supported by the NB-IoT UE is 1 resource block=180 kHz. A frequency channel of one resource block that can be supported by the NB-IoT UE is referred to as a "carrier".

The eMTC UE is operated within the LTE transmission/reception bandwidth. The NB-IoT UE supports a form operated within the LTE transmission/reception bandwidth, a form operated with a guard band outside the LTE transmission/reception bandwidth, and a form operated within the frequency band dedicated to the NB-IoT.

The eMTC UE and the NB-IoT UE support the enhanced coverage (EC) function using repetitive transmissions and the like to realize the coverage extension. The enhanced coverage function may include repetitive transmissions (repetition) in which the same signal using a plurality of subframes is repeatedly transmitted. The coverage can be extended as the number of the repetitive transmissions increases. The enhanced coverage function may include power boosting that increases the power density of the transmission signal. As an example, the power density is increased by narrow band transmission for narrowing the frequency bandwidth of the transmission signal. The coverage can be extended as the power density of the transmission signal is increased. The enhanced coverage function may include lower MCS (lower MCS) transmission for lowering the MCS used for the transmission signal. The coverage can be extended by performing transmission using the MCS with a low data rate and high error tolerance.

The eMTC UE and the NB-IoT UE in the RRC idle mode may determine that they are in the enhanced coverage when the first cell selection criterion (the 1S-criteria) for the normal coverage is not satisfied, and the second cell selection criterion (the 2S-criteria) for the enhanced coverage is satisfied. "The UE in enhanced coverage" may mean a UE that is required to use the enhanced coverage function (enhanced coverage mode) to access the cell.

The enhanced coverage function may have a plurality of enhanced coverage levels with different degrees of extending coverage. The eMTC UE and the NB-IoT UE measure reference signal received power (RSRP), and determine their own enhanced coverage level by comparing the measured RSRP with the RSRP threshold value for each enhanced coverage level. The enhanced coverage level is related to at least the number of transmissions (that is, the number of repetitions) in repetitive transmissions.

The UE in enhanced coverage performs cell reselection by ranking based on reception power (RSRP) regardless of the frequency priority in the cell reselection described above. For example, the UE calculates the ranking Rs of the current serving cell and the ranking Rn of the adjacent cell, and selects the cell having the ranking Rn higher than the Rs over a predetermined period (TreselectionRAT) as a target cell (new serving cell).

(Cell Reselection Control Method)

A method of controlling the cell reselection according to the first embodiment will be described.

Figure 7:
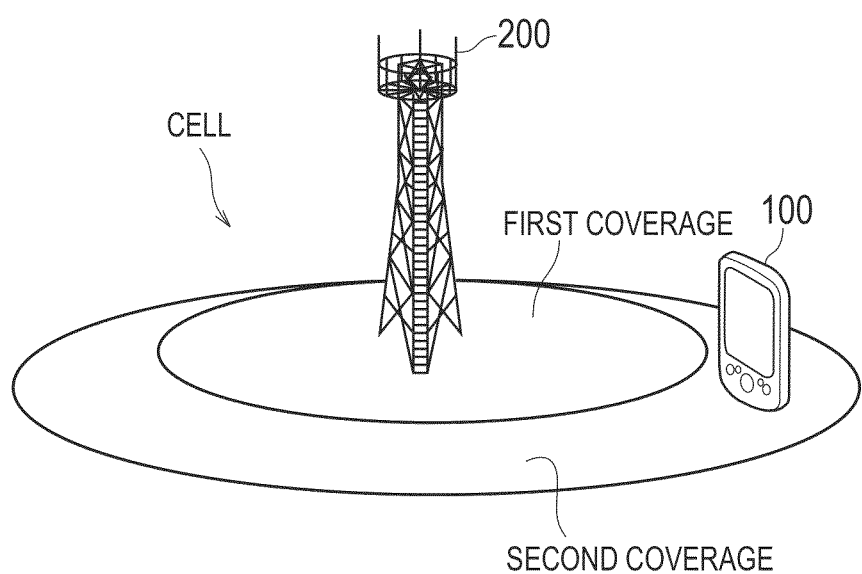
FIG. 7 is a diagram illustrating a scene where a cell reselection control method according to the embodiment is applied.

FIG. 7 is a diagram illustrating an application scene of the method of controlling the cell reselection according to the first embodiment.

As illustrated in FIG. 7, the cell managed by the eNB 200 includes a first coverage and a second coverage outside the first coverage. The first coverage is a coverage that is not extended by the enhanced coverage function (that is, normal coverage). The second coverage is a coverage extended by the enhanced coverage function (that is, enhanced coverage). In the first embodiment, an example in which the UE 100 in the second coverage is an eMTC UE will be described. However, the UE 100 in the second coverage may be an NB-IoT UE.

FIG. 8 is a diagram illustrating an operation of the eNB 200 according to the first embodiment.

As illustrated in FIG. 8 in step S11 the eNB 200 transmits, as a redistribution parameter used for the redistribution function, the first redistribution parameter applied to the UE in the first coverage through the use of broadcast signaling (for example, SIB).

The first redistribution parameter includes, for example, a parameter indicating a probability for each cell (redistributionFactorCell) or a parameter indicating a probability for each frequency (redistributionFactorFreq). The UE in the first coverage acquires the first redistribution parameter and performs cell reselection using the first redistribution parameter. In particular, the UE in the first coverage selects a redistribution target (frequency or cell) based on its own UE identifier (IMSI: International Mobile Subscriber Identity) and a parameter indicating the probability for each cell or frequency. For more details on this operation, for example, refer to Chapters 5.2.4.10 and 5.2.4.10.1 of the 3GPP specification "TS 36.304 V13.3.0 (2016-09)". The eNB 200 transmits the first redistribution parameter using an SIB type 3 and an SIB type 5.

In step S12 the eNB 200 transmits, as a redistribution parameter used for the redistribution function, the second redistribution parameter applied to the UE in the second coverage through the use of broadcast signaling. Step S12 may be performed simultaneously with step S11.

The type of each parameter included in the second redistribution parameter may be the same as the type of each parameter included in the first redistribution parameter. The value of the parameter included in the second redistribution parameter can be configured to a value different from the value of the parameter included in the first redistribution parameter. The eNB 200 may transmit the second redistribution parameter using the SIB type 3 and the SIB type 5. As an example, the second redistribution parameter is provided as an information element (IE) different from that of the first redistribution parameter in the SIB type 3 and the SIB type 5. Alternatively, the second redistribution parameter may be provided in a SIB different from the SIB type 3 and the SIB type 5. The eNB 200 applies the enhanced coverage function including the repetitive transmissions to the transmission of the SIB including the second redistribution parameter.

The eNB 200 may individually transmit the second redistribution parameter for each enhanced coverage level. For example, as illustrated in FIG. 9, in the SIB including the second redistribution parameter, a list of second redistribution parameters for each enhanced coverage level may be provided. In the example illustrated in FIG. 9, second redistribution parameters #0 to #3 are associated with enhanced coverage levels #0 to #3, respectively. Note that the higher the enhanced coverage level, the greater the number of repetitive transmissions, and the greater the degree of coverage extension. Therefore, the higher the enhanced coverage level, the higher the load on the cell (eNB 200). Therefore, by defining individual second redistribution parameter for each enhanced coverage level, it is possible to finely distribute the load of the cell (eNB 200).

FIG. 10 is a diagram illustrating an operation of the UE 100 in the second coverage according to the first embodiment.

As illustrated in FIG. 10 in step S21 in a state where the UE 100 has not received the second redistribution parameter, the UE 100 performs, regardless of the priority specified by eNB 200, cell reselection by ranking based on reception power (RSRP). For example, the UE calculates the ranking Rs of the current serving cell and the ranking Rn of the adjacent cell, and selects the cell having the ranking Rn higher than the Rs over a predetermined period (TreselectionRAT) as a target cell (new serving cell).

In step S22, the UE 100 receives the SIB including the second redistribution parameter, and acquires the second redistribution parameter included in the SIB. When the second redistribution parameters are transmitted separately for each enhanced coverage level, the UE 100 may acquire the second redistribution parameter corresponding to the enhanced coverage level applied to the UE 100. For example, when the list illustrated in FIG. 9 is included in the SIB, it is assumed that the UE 100 is in the enhanced coverage (second coverage) of the enhanced coverage level #2. In this case, the UE 100 acquires the second redistribution parameter #2 corresponding to the enhanced coverage level #2 from the list illustrated in FIG. 9.

In step S23A, the UE 100 performs cell reselection based on the second redistribution parameter and the identifier of the UE 100 instead of ranking. Specifically, instead of the cell reselection based on the ranking in step S21, the cell reselection is performed by the same method as the UE in the first coverage. For example, the UE 100 selects a redistribution target (frequency or cell) based on its own UE identifier (IMSI) and a parameter indicating the probability for each cell or frequency. When the current serving cell (or current serving frequency) is selected as the redistribution target, the UE 100 may maintain the current serving cell (or current serving frequency). When a cell (or frequency) different from the current serving cell (or current serving frequency) is selected as the redistribution target, the UE 100 is redistributed to the redistribution target. When redistributed to the redistribution target, the UE 100 considers that the redistributed redistribution target has the highest priority (that is, higher than the priority of any network configuration) for a certain period (that is, validity timer).

Such redistribution can be triggered by paging. T360 corresponding to a certain period (validity timer) may be included in the second redistribution parameter. When redistribution is not triggered by paging, the UE 100 performs the redistribution operation periodically (every time T360 expires).

The UE 100 may determine that the second redistribution parameter is applied to cell reselection while the second redistribution parameter is broadcast. When redistribution is triggered by paging, after acquiring the second redistribution parameter, the UE 100 may apply the second redistribution parameter to cell reselection when redistribution is triggered by paging. When redistribution is not triggered by paging, the UE 100 may determine that the second redistribution parameter is applied to cell reselection while T360 corresponding to a certain period (validity timer) is operating. Note that information indicating whether redistribution is triggered by paging may be included in the second redistribution parameter.

In this way, according to the first embodiment, the redistribution function can be applied to the UE 100 that is in the coverage (second coverage) extended by the enhanced coverage function. In addition, since individual redistribution parameters can be applied to the UE in the first coverage and the UE 100 in the second coverage, the cell and/or frequency reselected by the UE 100 in the second coverage by cell reselection can be appropriately distributed.

In the first embodiment, the second redistribution parameter may be applied to cell reselection at least within the same frequency (intra-frequency). In the general redistribution function, it should be noted that the redistribution parameter is applied only to cell reselection between different frequencies (inter-frequency). The UE 100 in the coverage extended by the enhanced coverage function (second coverage) is assumed to be a UE that does not move, and it may be possible that it cannot detect the adjacent cell of different frequencies, and can detect only the adjacent cell of the same frequency. Thus, by applying the second redistribution parameter to cell reselection within the same frequency, cell reselection to the adjacent cell of the same frequency can be enabled using the second redistribution parameter. The second redistribution parameter may be transmitted/received separately from the redistribution parameter for between different frequencies as a redistribution parameter for within the same frequency. The second redistribution parameter may be transmitted/received as a parameter specific to a cell within the same frequency.

First Modification of the First Embodiment

A first modification of the first embodiment will be described. In the first embodiment described above, after acquiring the second redistribution parameter, the UE 100 in the second coverage performs cell reselection based on the second redistribution parameter and the identifier of the UE 100 instead of ranking. In contrast, in the first modification of the first embodiment, the UE 100 in the second coverage performs cell reselection by applying a predetermined offset value to the ranking after acquiring the second redistribution parameter.

In the first modification of the first embodiment, the eNB 200 may include an offset value applied to the ranking in the second redistribution parameter. The eNB 200 may individually transmit the second redistribution parameter including the offset value for each enhanced coverage level (see FIG. 9). The offset value may be a positive offset value that is adjusted to increase reception power (that is, ranking) corresponding to a specific cell or a specific frequency. The offset value may be a negative offset value that is adjusted to decrease the reception power (that is, ranking) corresponding to a specific cell or a specific frequency.

The offset value may be an infinite value. When the value is a positive infinite value, the specific cell or the specific frequency corresponding to the offset value is configured to the highest priority, and the specific cell or the specific frequency is necessarily selected as a redistribution target. Alternatively, the offset value may be a finite value (for example, 5 dB). When the value is a positive finite value, the specific cell or the specific frequency corresponding to the offset value is not necessarily configured to the highest priority, and the specific cell or the specific frequency is likely to be configured to the highest priority.

The offset value may not be included in the second redistribution parameter. As the offset value, a value defined in the specification may be preconfigured in the UE 100. Hereinafter, an example in which the offset value is included in the second redistribution parameter will be described.

FIG. 11 is a diagram illustrating an operation of a UE 100 in a second coverage according to a first modification of the first embodiment.

As illustrated in FIG. 11, step S21 is the same as that in the above-described first embodiment.

In step S22, the UE 100 receives the SIB including the second redistribution parameter, and acquires the second redistribution parameter included in the SIB. The second redistribution parameter may include an offset value for each cell or an offset value for each frequency. The second redistribution parameter may include a combination of an identifier and an offset value of a specific cell, or a combination of discernment and an offset value of a specific frequency. When the second redistribution parameters are transmitted separately for each enhanced coverage level, the UE 100 may acquire the second redistribution parameter corresponding to the enhanced coverage level applied to the UE 100.

In step S23B, the UE 100 performs cell reselection by applying a predetermined offset value to the ranking. For example, the UE calculates the ranking Rs of the current serving cell and the ranking Rn of the adjacent cell, applies an offset value to the ranking, and selects the cell having the highest ranking with the offset as the target cell (new serving cell) over the predetermined period (TreselectionRAT).

The UE 100 may determine that the second redistribution parameter is applied to cell reselection while the second redistribution parameter is broadcast. When redistribution is triggered by paging, after acquiring the second redistribution parameter, the UE 100 may apply the second redistribution parameter to cell reselection when redistribution is triggered by paging. Note that information indicating whether redistribution is triggered by paging may be included in the second redistribution parameter. When redistribution is not triggered by paging, the UE 100 may determine that the second redistribution parameter is applied to cell reselection while T360 corresponding to a certain period (validity timer) is operating.

Second Modification of First Embodiment

In the example described in the above-described first embodiment, a redistribution parameter for the same frequency (intra-frequency) is transmitted and received separately from a redistribution parameter for redistribution to a different frequency (inter-frequency). The second modification of the first embodiment relates to details on an intra-frequency redistribution parameter and an inter-frequency redistribution parameter, as well as a redistribution procedure using these.

In the second modification of the first embodiment, the eNB 200 that manages the cell belonging to a first frequency transmits to the UE 100 selecting the cell as a serving cell while being in the idle mode, an intra-frequency redistribution parameter for redistributing the UE 100 to another cell belonging to the first frequency, and an inter-frequency redistribution parameter for redistributing the UE 100 to a second frequency different from the first frequency. The UE 100 receives the intra-frequency redistribution parameter and the inter-frequency redistribution parameter, and uses at least one of the intra-frequency redistribution parameter and the inter-frequency redistribution parameter, to select a redistribution target that is a frequency or a cell provided with the highest priority for cell reselection.

As described above, the current 3GPP specification supports inter-frequency redistribution parameters, but does not support intra-frequency redistribution parameters. The UE 100 in the coverage (second coverage) extended by the enhanced coverage function is assumed to be a UE that does not move, and may be incapable of detecting a neighbouring cell belonging to a different frequency and capable of detecting a neighbouring cell belonging to the same frequency only. Thus, the intra-frequency redistribution parameter may be introduced to enable cell reselection to a neighbouring cell belonging to the same frequency.

However, when the UE 100 executes cell reselection to a neighbouring cell belonging to the same frequency, the original serving cell may be the optimal cell (Best Cell) for the UE 100, and the reselected neighbouring cell may not be the optimal cell. In such a situation, a scenario is assumed in which the UE 100 transitions to the connected mode in the reselected neighbouring cell and executes uplink transmission to the reselected neighbouring cell. Alternatively, when early data transmission currently under consideration in 3GPP is used, the UE 100 may transmit uplink data to the reselected neighbouring cell during a random access procedure, and terminate the random data procedure without transitioning to the connected mode.

In such a scenario, the uplink transmission to the reselected neighbouring cell results in strong uplink interference to the original serving cell belonging to the same frequency as the neighbouring cell. Specifically, since the original serving cell and the reselected neighbouring cell belong to the same frequency, frequency interference occurs. Therefore, it is desirable that the redistribution procedure using the intra-frequency redistribution parameter is executed with low priority.

In view of this, in the second modification of the first embodiment, the UE 100 selects a redistribution target by using the inter-frequency redistribution parameter with priority over the intra-frequency redistribution parameter. Specifically, by executing the redistribution procedure using the intra-frequency redistribution parameter with low priority, it is possible to suppress the occurrence of the above-described interference.

For example, the UE 100 having both the intra-frequency redistribution parameter and the inter-frequency redistribution parameter configured performs the following operation. The state of "having both the intra-frequency redistribution parameter and the inter-frequency redistribution parameter configured" may indicate a state in which the UE 100 has received both the intra-frequency redistribution parameter and the inter-frequency redistribution parameter. First of all, the UE 100 executes an inter-frequency redistribution procedure of selecting a redistribution target by using the inter-frequency redistribution parameter. The UE 100 may execute an intra-frequency redistribution procedure of selecting a redistribution target using the intra-frequency redistribution parameter only when the inter-frequency redistribution procedure has failed. Thus, the UE 100 does not execute the intra-frequency redistribution procedure when the inter-frequency redistribution procedure is successful and a redistribution target is selected using the inter-frequency redistribution parameter. That is, UE 100 searches for a cell belonging to the same frequency only when an appropriate cell belonging to another frequency is not found.

The UE 100 may be able to execute the intra-frequency redistribution procedure when both the intra-frequency redistribution procedure and the inter-frequency redistribution procedure are triggered, in a case that a redistribution instruction is issued by paging from the network. The UE 100 does not perform the intra-frequency redistribution procedure when the inter-frequency redistribution procedure is triggered by the paging and the intra-frequency redistribution procedure is not triggered by the paging.

The UE 100 may be able to execute the intra-frequency redistribution procedure when a notification indicating that both the intra-frequency redistribution procedure and the inter-frequency redistribution procedure are to be executed has been broadcasted from the SIB. Thus, the UE 100 does not execute the intra-frequency redistribution procedure when the notification indicating that both the intra-frequency redistribution procedure and the inter-frequency redistribution procedure are to be executed has not been broadcasted by the SIB.

In the second modification of the first embodiment, the eNB 200 may transmit to the UE 100, a notification indicating that the selection of the redistribution target by using the intra-frequency redistribution parameter is permitted. Such a notification may be broadcast by SIB (SIB type 3, for example). The selection of a redistribution target using the intra-frequency redistribution parameter may be enabled by the UE 100 only when the notification is received. As long as such a notification is not received, the UE 100 executes only the inter-frequency redistribution procedure and does not execute the intra-frequency redistribution procedure.

In the second modification of the first embodiment, the UE 100 may be located in the coverage extended by the enhanced coverage function including the repeated transmission. The intra-frequency redistribution parameter may be applied only to UEs 100 located in the coverage extended by the enhanced coverage function. In such a case, the intra-frequency redistribution parameter is not applied to UEs 100 located in the normal coverage not extended by the enhanced coverage function.

Next, the details of the inter-frequency redistribution parameter and the redistribution procedure using the same (inter-frequency redistribution procedure) will be described. As described above, the inter-frequency redistribution procedure is defined in, for example, section 5.2.4.10 "E-UTRAN Inter-frequency Redistribution procedure" and in section 5.2.4.10.1 "Redistribution target selection" of the 3GPP specification "TS 36.304 V13.3.0 (2016-09)".

The eNB 200 transmits the redistribution parameters using SIB type 3 and SIB type 5. The inter-frequency redistribution parameter of the redistribution parameters corresponds to RedistributionInterFreqInfo included in SIB type 5. RedistributionInterFreqInfo is defined for each adjacent frequency in an adjacent frequency list (InterFreqCarrierFreqList). Note that SIB type 5 is an SIB that includes information on inter-frequency cell reselection.

Figure 12:
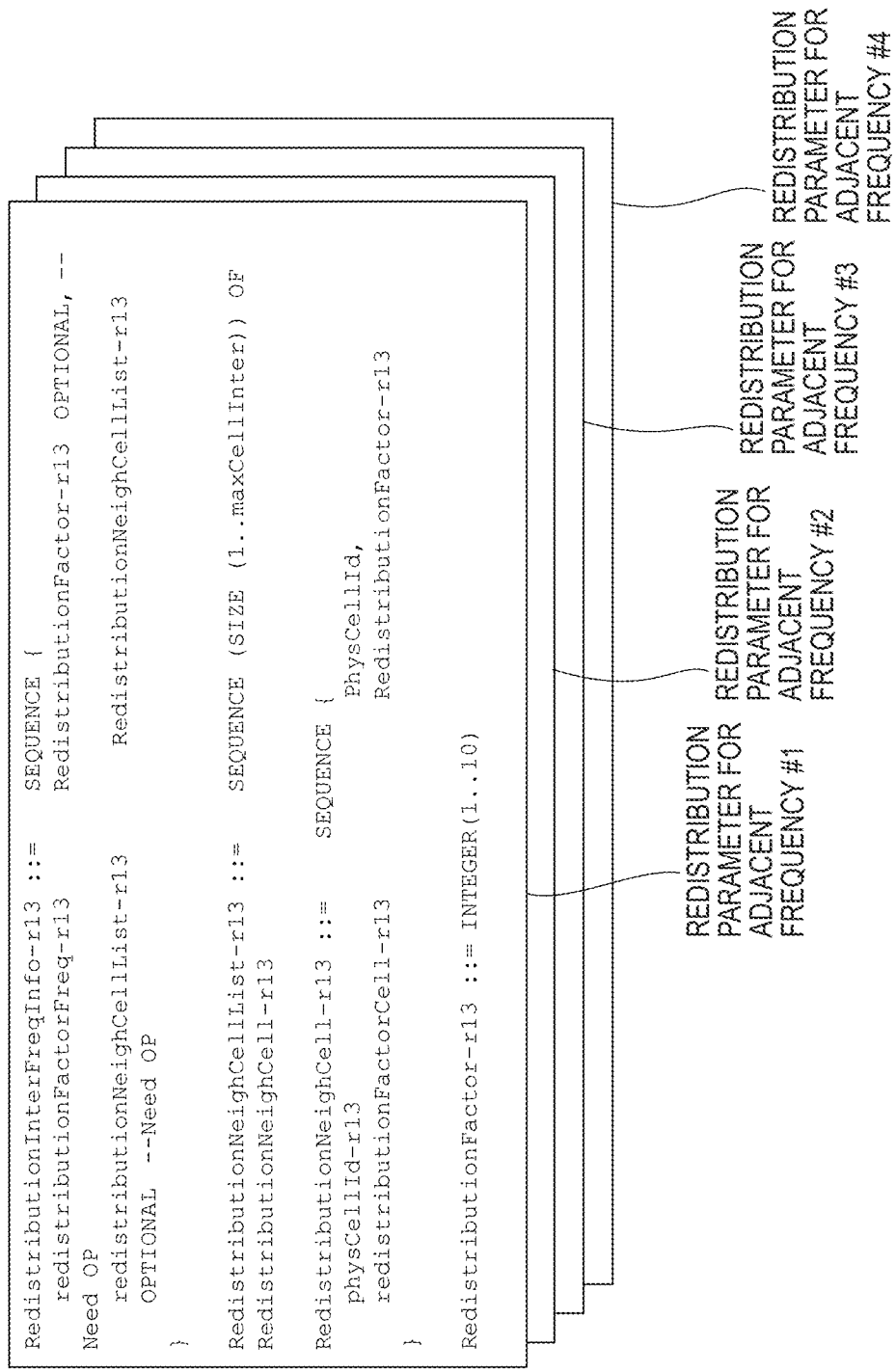
FIG. 12 is a diagram illustrating an inter-frequency redistribution parameter (RedistributionInterFreqInfo).

FIG. 12 is a diagram illustrating the inter-frequency redistribution parameter (RedistributionInterFreqInfo). In each information element illustrated in FIG. 12, "-r13" indicates that the element is introduced with Release 13 of the 3GPP specification. This sign will be omitted in the description below.

As illustrated in FIG. 12, RedistributionInterFreqInfo is provided for each adjacent frequency in an adjacent frequency list (InterFreqCarrierFreqList). RedistributionInter- FreqInfo includes a parameter (redistributionFactorFreq) that determines the probability of the corresponding adjacent frequency being selected as a redistribution target. Alternatively, RedistributionInterFreqInfo may include a list of cells (redistributionNeighCellList) belonging to the adjacent frequency, and may include a parameter (redistributionFactorCell) that determines a probability of each cell being selected as a redistribution target. The cell list (redistributionNeighCellList) includes an information element (RedistributionNeighCell) for each cell. The information element (RedistributionNeighCell) for each cell includes a physical cell identifier (PhysCellId) and a parameter (redistributionFactorCell) that determines the probability of the corresponding cell.

The UE 100 executes the redistribution procedure (inter-frequency redistribution procedure) as defined in section 5.2.4.10 of TS 36.304 by using the inter-frequency redistribution parameter (RedistributionInterFreqInfo), in the following manner.

The UE100 performs an inter-frequency measurement as defined in section 5.2.4.2 of TS 36.304, when the UE 100 has the redistribution capability, the redistributionServingInfo is included in SIB type 3, redistributionInterFreqInfo is included in SIB type 5, and no dedicated priority is configured to the UE100 and when:

T360 is not running and SIB Type 3 does not include RedistrOnPagingOnly;

T360 has expired and SIB Type 3 does not include redistrOnPagingOnly; or a paging message including redistributionIndication is received.

Note that RedistrOnPagingOnly indicates that the redistribution procedure is triggered only by paging, and is an information element of SIB type 3. redistributionIndication indicates that a redistribution procedure is to be triggered, and is an information element of a paging message.

When the measurement result of the inter-frequency measurement becomes available, the UE 100 executes the redistribution target selection as defined in section 5.2.4.10.1 of TS 36.304 and starts T360. T360 is an SIB type 3 information element.

The UE 100 stops T360 and does not take the frequency or cell that is the redistribution target into consideration in the following case.

The UE 100 enters an RRC CONNECTED state;

T360 has expired;

a paging message including redistributionIndication is received while the T360 is running: or the UE 100 reselects a cell that does not belong to the redistribution target.

Next, the redistribution target selection as defined in section 5.2.4.10.1 of TS 36.304 is performed as follows.

The UE 100 compiles a list of one or more redistribution targets sorted and compiles a valid redistrFactor [j] for each candidate entry [j]. The entries are added in the ascending order of index from index 0 as follows.

For serving frequency (SIB type 3 includes redistributionFactorServing whenever redistribution is configured):

serving cell if redistributionFactorCell is included;

serving frequency if not;

in both cases, redistrFactor [0] is configured to redistributionFactorServing.

For each entry in InterFreqCarrierFreqList and each entry in InterFreqCarrierFreqListExt following that:

if redistributionNeighCellList is configured with this cell included, the cell ranked as the best cell at this frequency as defined in TS 36.304 section 5.2.4.6;

if not, the relevant frequency if redistributionFactorFreq is configured and at least one cell on the frequency satisfies the cell selection criterion S defined in 5.2.3.2 of TS 36.304;

if the cell is included, redistrFactor [j] is configured to the corresponding redistributionFactorCell. If a frequency is included, redistrFactor [j] is configured to the corresponding redistributionFactorFreq.

The UE 100 selects a redistribution target as follows.

If the following Formula 1 holds, the UE 100 selects a frequency or a cell corresponding to redistrFactor [0] as a redistribution target.

$$ueID \leq 200 \cdot rredistrRange \qquad \text{[Formula 1]}$$

When the following Formula 2 holds, the UE 100 selects a frequency or a cell corresponding to redistrFactor [i] as a redistribution target.

$$200 \cdot \Sigma_{j=0}^{j=i-1} redistrRange[j]$$
$$< ueID \leq 200 \cdot \Sigma_{j=0}^{j=i} redistrRange[j] \qquad \text{[Formula 2]}$$

Here, ueID is determined based on IMSI of the UE 100 according to Formula 3 below.

$$ueID = (IMSI \bmod 100) \cdot 2 + 1 \qquad \text{[Formula 3]}$$

If there is no redistribution candidate other than the serving frequency or cell, redistrRange [0]=1 holds. When there is a redistribution candidate other than the serving frequency or the cell, redistrRange [i] of the E-UTRAN frequency or the cell is determined by the following Formula 4.

$$redistrRange[i] = \frac{redistrFactor[i]}{\sum_{j=0}^{j=(maxCandidates-1)} redistrFactor[j]} \qquad \text{[Formula 4]}$$

Here, maxCandidates is the total number of frequencies/cells having valid redistrFactor [j].

In such an inter-frequency redistribution procedure, the case that the inter-frequency redistribution procedure has ended in failure may mean a case that there is no redistribution candidate other than the serving frequency or the serving cell (i.e., a neighbouring cell satisfying the cell selection criterion S).

Next, an example of an intra-frequency redistribution parameter and a redistribution procedure using the same (intra-frequency redistribution procedure) will be described. The intra-frequency redistribution parameter is included in, for example, SIB type 4. SIB type 4 is an SIB including information on intra-frequency cell reselection. In the intra-frequency redistribution procedure, the redistribution parameter included in SIB type 3 may be the same as that in the inter-frequency redistribution procedure, or a new redistribution parameter corresponding to the redistribution parameter included in SIB type 3 may be provided in SIB type 3 (or another type of SIB) for the intra-frequency redistribution procedure.

SIB type 4 includes an intra-frequency cell list (intraFreqNeighCellList). The intra-frequency redistribution parameter includes, as an information element (RedistributionNeighCell) for each cell in the list (intraFreqNeighCellList), a parameter (redistributionFactorCell) that for determining a probability of being selected as a redistribution target. Specifically, the information element (RedistributionNeighCell) for each cell includes a physical cell identifier (PhysCellId) and a parameter (redistributionFactorCell) that determines the probability of the corresponding cell.

The intra-frequency redistribution procedure is a procedure with the operation related to frequency selection, as in the redistribution target selection defined in section 5.2.4.10.1 of TS 36.304, omitted and uses an operation related to cell selection as in the redistribution target selection. That is, the serving cell is configured to redistrFactor [0], and the corresponding redistributionFactorCell is configured to redistrFactor [j].

For example, the intra-frequency redistribution procedure is implemented with the redistribution target selection specified in section 5.2.4.10.1 of TS 36.304 modified as follows.

The UE 100 compiles a list of one or more redistribution targets sorted and compiles a valid redistrFactor [j] for each candidate entry [j]. The entries are added in the ascending order of index from index 0 as follows. For the serving frequency, RedistrFactor [0] is configured to redistributionFactorServing. For each entry in the intraFreqNeighCellList, redistrFactor [j] is configured to the corresponding redistributionFactorCell.

The UE 100 selects a redistribution target as follows. When the above Formula 1 holds, the UE 100 selects a cell corresponding to redistrFactor [0] as a redistribution target. When the above Formula 2 holds, the UE 100 selects a frequency or a cell corresponding to redistrFactor [i] as a redistribution target. When there is no redistribution candidate other than the serving cell, redistrRange [0]=1 holds. In other cases, redistrRange [i] of the E-UTRAN cell is determined by Formula 4 above.

Figure 13:
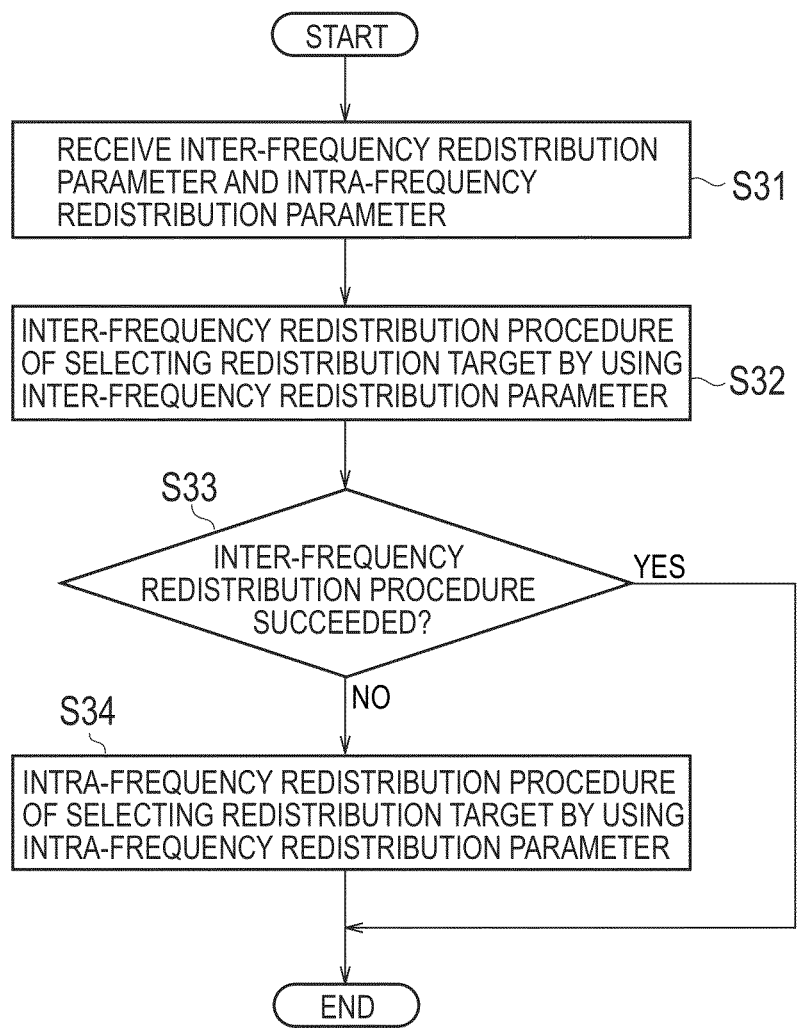
FIG. 13 is a diagram illustrating an operation of a UE according to a second modification of the first embodiment.

FIG. 13 is a diagram illustrating an example of an operation of the UE 100 according to the second modification of the first embodiment. This operation is performed under an assumption that the UE 100 is in an idle mode, and cell of the eNB 200 is selected as a serving cell. The UE 100 is located in the extended coverage (second coverage) of the cell of eNB 200 (see FIG. 7).

As illustrated in FIG. 13, in step S31, the UE 100 receives an inter-frequency redistribution parameter and an intra-frequency redistribution parameter from the eNB 200. At this time, the UE 100 may receive the inter-frequency redistribution parameter and the intra-frequency redistribution parameter from the eNB 200 at once or at different timings. Furthermore, instead of receiving the parameters from the eNB 200, the UE 100 may store both the inter-frequency redistribution parameter and the intra-frequency redistribution parameter in a memory in the controller 130 in advance. In such a case, step S31 may be omitted. The UE 100 may store one of the inter-frequency redistribution parameter and the intra-frequency redistribution parameter in a memory in the controller 130 in advance, and receive the other from the eNB 200.

In step S32, the UE 100 executes an inter-frequency redistribution procedure for selecting a redistribution target by using the inter-frequency redistribution parameter. If the inter-frequency redistribution procedure is successful (step S33: YES), the UE 100 deems that the redistribution target selected in the inter-frequency redistribution procedure has the highest priority, and reselects a neighbouring cell (cell of an adjacent frequency) corresponding to the redistribution target thus selected, as a new serving cell for the UE 100. Note that UE 100 may execute step S32 only after configuring the inter-frequency redistribution parameter and the intra-frequency redistribution parameter after step S31.

On the other hand, if the inter-frequency redistribution procedure fails (step S33: NO), in step S34, the UE 100 executes an intra-frequency redistribution procedure for selecting a redistribution target by using the intra-frequency redistribution parameters. The UE 100 deems that the redistribution target selected in the intra-frequency redistribution procedure has the highest priority, and reselects a neighbouring cell (cell of a serving frequency) corresponding to the redistribution target thus selected, as a new serving cell for the UE 100. Note that, if the inter-frequency redistribution procedure and the intra-frequency redistribution procedure both fail, the UE 100 maintains the current serving cell.

In the flow in FIG. 13, even when the inter-frequency redistribution procedure is successful, the UE 100 receives (acquires) the intra-frequency redistribution parameters from the eNB 200 in step S31. Alternatively, the UE 100 may receive the intra-frequency redistribution parameter from the eNB 200 when the inter-frequency redistribution procedure fails. In such a case, the UE 100 does not receive the intra-frequency redistribution parameter from the eNB 200 in step S31, and receives the intra-frequency redistribution parameter from the eNB 200 when the inter-frequency redistribution procedure fails (step S33: NO), to execute the intra-frequency redistribution procedure in step S34.

Second Embodiment

A second embodiment will be described while mainly focusing on the differences from the first embodiment.

Outline of Second Embodiment

In the first embodiment described above, using the redistribution function, the operation of appropriately distributing the UEs 100 in an idle mode in the coverage extended by the enhanced coverage function to a plurality of cells and/or frequencies by cell reselection has been described.

The second embodiment is an embodiment that makes it possible to obtain the same effect as the first embodiment by improving the normal cell reselection procedure without using the redistribution function. The second embodiment is mainly directed to the UE 100 in an idle mode in the coverage extended by the enhanced coverage function. However, the second embodiment may be applied to the UE 100 in an idle mode in the normal coverage.

As mentioned above, the UE 100 in enhanced coverage performs cell reselection by the ranking based on reception power (RSRP) regardless of the priority of the frequency in cell reselection. For example, the UE calculates the ranking Rs of the current serving cell and the ranking Rn of the adjacent cell, and selects the cell having the ranking Rn higher than the Rs over a predetermined period (TreselectionRAT) as a target cell (new serving cell). For example, the Rs is calculated by Rs=Qmeas,s+QHyst−Qoffsettemp. Rn is calculated by Rn=Qmeas,n−Qoffset-Qoffsettemp. Here, various offset values (Qoffsettemp, QHyst, Qoffset) are part of cell reselection parameters included in the SIB broadcast from the eNB 200.

Under these assumptions, it is conceivable that by changing the cell reselection parameter in the first cell with high load (hereinafter referred to as a "first cell reselection parameter"), the UE 100 in the first cell is caused to perform cell reselection to the second cell (adjacent cell) to distribute the load of the first cell to the second cell. When the UE 100 performs cell reselection to the second cell, the UE 100 performs cell reselection using the SIB broadcast in the second cell. In particular, the UE 100 performs the above ranking operation using the cell reselection parameter acquired from the second cell (hereinafter referred to as a "second cell reselection parameter"), and determines whether to stay in the second cell or to perform cell reselection to the adjacent cell. Here, when the second cell reselection parameter is inappropriate, the UE 100 may perform cell reselection from the second cell to the first cell using the second cell reselection parameter immediately after performing cell reselection from the first cell to the second cell. When such a ping-pong phenomenon occurs, the load of the first cell cannot be distributed to the second cell.

It may be conceivable that when changing the first cell reselection parameter in the first cell with high load, the second cell also changes the second cell reselection parameter, so that the occurrence of the ping-pong phenomenon may be avoided. However, when the cell reselection parameter is changed for load distribution of the cell, it is necessary for the cell reselection parameter to be able to change frequently (dynamically). It is inefficient and not a desirable method that the second cell reselection parameter is changed in the second cell every time the first cell reselection parameter is changed in the first cell.

To solve such a problem, the method of controlling a cell reselection according to the second embodiment includes a step in which the UE 100 selecting a first cell as a serving cell receives a first cell reselection parameter broadcast from the first cell, a step in which the UE 100 reselects a second cell different from the first cell as the serving cell using the first cell reselection parameter, and a step in which the UE 100 defers a start of cell reselection using a second cell reselection parameter broadcast from the second cell until a predetermined period elapses after the second cell is reselected as the serving cell.

In this way, the UE 100 that has performed cell reselection from the first cell to the second cell using the first cell reselection parameter defers the start of cell reselection using the second cell reselection parameter broadcast from the second cell until the predetermined period has elapsed since reselecting the second cell. As a result, the operation in which the UE 100 performs cell reselection from the second cell to the first cell using the second cell reselection parameter immediately after performing cell reselection from the first cell to the second cell, that is, the ping-pong phenomenon, can be prevented.

The cell reselection includes comparing the first ranking determined according to the first reception power corresponding to the serving cell with the second ranking determined according to the second reception power corresponding to the adjacent cell. Each of the first cell reselection parameter and the second cell reselection parameter includes an offset value applied to the first reception power and/or an offset value applied to the second reception power.

In the method of controlling the cell reselection according to the second embodiment, the method further includes a step in which the UE 100 continues to use the first cell reselection parameter for cell reselection until a predetermined period elapses after the second cell is reselected as the serving cell.

The method of controlling the cell reselection according to the second embodiment further includes a step in which the UE 100 receives information specifying the predetermined period, where the information is broadcast from the first cell. The deferring step includes a step of deferring a start of cell reselection using the second cell reselection parameter until a predetermined period designated from the first cell elapses after the second cell is reselected as the serving cell.

The UE 100 according to the second embodiment includes, a receiver configured to receive, when selecting a first cell as a serving cell, a first cell reselection parameter broadcast from the first cell, and a controller configured to reselect, as the serving cell, a second cell different from the first cell using the first cell reselection parameter. The controller defers a start of cell reselection using a second cell reselection parameter broadcast from the second cell until a predetermined period elapses after the second cell is reselected as the serving cell.

In the second embodiment, "deferring the start of cell reselection using the second cell reselection parameter" includes not performing the cell reselection procedure itself, not performing measurement (especially measurement of reception power) of cell reselection procedures, or not applying the second cell reselection parameter (the measurement/reselection procedure may be started/executed).

Example of Operation According to the Second Embodiment

An example of the operation according to the second embodiment will be described. Here, as the cell reselection parameter, Qoffset, which is an offset value used for calculating the ranking Rn of the adjacent cell, is indicated as an example. The ranking Rn is calculated by "Qmeas,n−Qoffset−Qoffsettemp". That is, Qoffset is an offset value applied to the reception power Qmeas,n corresponding to the adjacent cell. By changing the value of Qoffset, the ranking of the adjacent cell can be changed relative to the ranking of the serving cell. For example, when giving a positive offset value to the reception power "Qmeas,n" corresponding to the adjacent cell by Qoffset, the ranking of the adjacent cell is relatively high, and it is possible to prompt cell reselection to the adjacent cell.

Qoffset is configured for each adjacent cell. The eNB 200 broadcasts a plurality of sets of the cell ID which is an identifier of the adjacent cell and Qoffset through the use of SIB. Qoffset according to the second embodiment, that is, Qoffset that is valid within a predetermined time in the adjacent cell may be provided in the SIB as a new information element different from the existing Qoffset that is invalidated in the adjacent cell. Regarding Qoffset as being same as the existing information element, an identifier or a flag indicating that it is valid within a predetermined time also in the adjacent cell may be associated with Qoffset in the SIB. Regarding Qoffset as being same as the existing information element, when information specifying a predetermined period is broadcast, the UE 100 may determine that Qoffset is valid within a predetermined time even in the adjacent cell.

Figure 14:
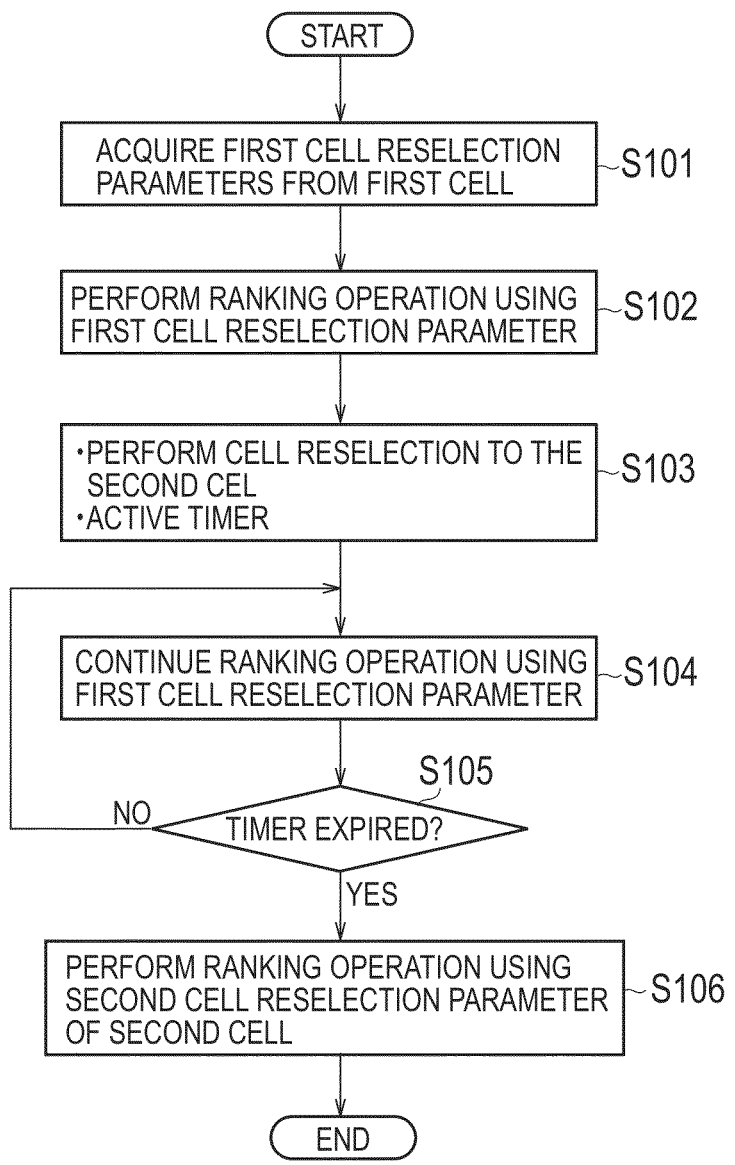
FIG. 14 is a diagram illustrating an operation example of a UE in an idle mode according to a second embodiment.

FIG. 14 is a diagram illustrating an operation example of a UE 100 in an idle mode according to the second embodiment. The UE 100 may be a UE 100 that is in a coverage extended by the enhanced coverage function.

As illustrated in FIG. 14, in step S101, the UE 100 acquires the SIB including the first cell reselection parameter (Qoffset) from the first cell that is the current serving cell. Here, it is assumed that the first cell reselection parameter (Qoffset) is a value that relatively increases the ranking of the adjacent cell. The UE 100 may further acquire information (timer value) specifying a predetermined time from the first cell. The timer value may be included in the SIB same as an SIB including the first cell reselection parameter (Qoffset), or may be included in the SIB different from the above SIB.

In step S102, the UE 100 performs a ranking operation using the first cell reselection parameter (Qoffset). The UE 100 calculates the current serving cell ranking Rs and the adjacent cell ranking Rn, and selects a cell having a ranking Rn higher than Rs over a predetermined period (TreselectionRAT) as a target cell (new serving cell). For example, the Rs is calculated by Rs=Qmeas,s+QHyst−Qoffsettemp. Rn is calculated by Rn=Qmeas,n−Qoffset-Qoffsettemp. Here, it is assumed that the second cell that is one of the adjacent cells is selected as a new serving cell by the ranking operation.

In step S103, the UE 100 performs cell reselection from the first cell to the second cell. When performing cell reselection from the first cell to the second cell, the UE 100 starts a timer corresponding to a predetermined time designated from the first cell. The start timing of the timer may be the timing for performing cell reselection to the second cell, for example, the timing for determining cell reselection to the second cell, the timing for completing cell reselection to the second cell, or the like.

In step S104, the UE 100 continues the ranking operation using the first cell reselection parameter (Qoffset) during the timer operation. At this point because the second cell is the current serving cell, when UE 100 uses the first cell reselection parameter (Qoffset) as it is, the ranking of the first cell, which is the adjacent cell, is high. Therefore, the UE 100 may reverse the positive and negative of the first cell reselection parameter (Qoffset) and use it for the ranking operation.

The UE 100 does not acquire (that is, ignore) the second cell reselection parameter (Qoffset) broadcast in the second cell during the timer operation. Alternatively, even when the UE 100 acquires the second cell reselection parameter (Qoffset) broadcast in the second cell during the timer operation, the second cell reselection parameter (Qoffset) is retained or discarded without being applied to the ranking operation.

When the timer has expired (step S105: YES), in step S106, the UE 100 acquires the second cell reselection parameter (Qoffset) from the second cell when it does not have the second cell reselection parameter (Qoffset), and starts the ranking operation using the second cell reselection parameter (Qoffset).

This flow explained an example in which the UE 100 continues the ranking operation using the first cell reselection parameter during the timer operation. However, the UE 100 may interrupt the ranking operation itself during the timer operation, and start the ranking operation using the second cell reselection parameter after the timer expires. Alternatively, the eNB 200 may provide the UE 100 with an exceptional cell reselection parameter that is valid only during the timer operation separately from the normal cell reselection parameter. In this case, the UE 100 may perform a ranking operation using the exceptional cell reselection parameter during the timer operation.

Third Embodiment

The third embodiment will be described mainly with respect to differences from the first and the second embodiment.

Outline of Third Embodiment

In the third embodiment is an embodiment in which when the cell load is high, the cell can be prevented from shutting down by restricting the UE 100 access to the cell. The third embodiment is mainly directed to the UE 100 in an idle mode in the coverage extended by the enhanced coverage function. However, the third embodiment may be directed to the UE 100 in the idle mode in normal coverage.

The UE 100 in an idle mode in the extended coverage is, for example, an eMTC UE and/or an NB-IoT UE. In general, since such a UE 100 stays in the same cell without moving, once access restriction is applied, communication with the network is not possible until the access restriction is cancelled.

To solve such a problem, in the access restriction method according to the third embodiment, the method includes a step in which the eNB 200 broadcasts an advance notification indicating that the access restriction is started after a predetermined time before the eNB 200 starts the access restriction, a step in which the UE 100 receives the advance notification, a step which the UE 100 determines, based on the advance notification, whether to access the eNB 200 within the predetermined time, and a step in which the eNB 200 starts the access restriction after the predetermined time has elapsed since the advance notification was broadcast.

In this way, since the UE 100 can grasp in advance that the access restriction will start by broadcasting an advance notification before the eNB 200 starts access restriction, when the access is needed, the access to the eNB 200 can be performed before the access restriction is started. In addition, due to the advance notification, congestion may occur when a large number of the UEs 100 perform access at the same time within a predetermined time. However, compared to the case where the access restriction is performed without notice, the possibility that data transmission/reception to and from some of the UEs 100 (particularly, eMTC UEs and/or NB-IoT UEs with extended coverage) can be completed can be increased.

The access restriction method according to the third embodiment further includes a step of configuring one or a plurality of access classes in the UE 100, a step in which the eNB 200 broadcasts access class information indicating a specific access class allowing access to the eNB 200 within the predetermined time, a step in which the UE 100 receives the access class information, and a step in which when any of the one or the plurality of access classes configured in the UE 100 is the specific access class, the UE 100 determines that the UE 100 is permitted to access the eNB 200 within the predetermined time. Accordingly, it is possible to suppress the number of UEs 100 that perform access within a predetermined time before the access restriction is started, and to reduce the possibility of congestion. For example, an operation in which the eNB 200 designates an access class corresponding to the eMTC UE and/or the NB-IoT UE and permits the access is also possible. Such a method can be applied without being limited to "within a predetermined time". In other words, the step of configuring one or a plurality of access classes in the UE 100 without assuming the above-described advance notification, the step in which the eNB 200 broadcasts access class information indicating a specific access class that permits access to the eNB 200, the step in which the UE 100 receives access class information, and the step in which the UE 100 determines that the UE 100 is permitted to access the eNB 200 when any of one or a plurality of access classes configured in the UE 100 is a specific access class may be performed alone.

In the third embodiment, a priority order may be associated with an access class. The UE 100 compares the priority order corresponding to the access class information (specific access class) received from eNB 200 with the priority order corresponding to the access class configured in the UE 100. The UE 100 may determine that when the priority order corresponding to the access class configured in UE 100 is equal to or higher than the priority order corresponding to the access class information received from eNB 200, access to the eNB 200 within a predetermined time is permitted. For example, when the priority order of the access classes is defined from "1" to "4", the priority order "2" is configured in the UE 100, and the eNB 200 is broadcasting the priority order "3", since the priority order "2" is higher than the priority order "3", the UE 100 determines that the access is permitted. The eNB 200 according to the third embodiment includes a transmitter configured to broadcast, before an access restriction to restrict access to the eNB 200 from the UE 100 is started, an advance notification indicating that the access restriction is started after a predetermined time, and a controller configured to start the access restriction after the predetermined time has elapsed since the advance notification was broadcast.

The UE 100 according to the third embodiment includes a receiver configured to receive, from the eNB 200, an advance notification indicating that an access restriction to restrict access to the eNB 200 from the UE 100 is started after a predetermined time, and a controller configured to determine, based on the advance notification, whether to access the eNB 200 within the predetermined time.

(Example of Operation According to the Third Embodiment)

Figure 15:
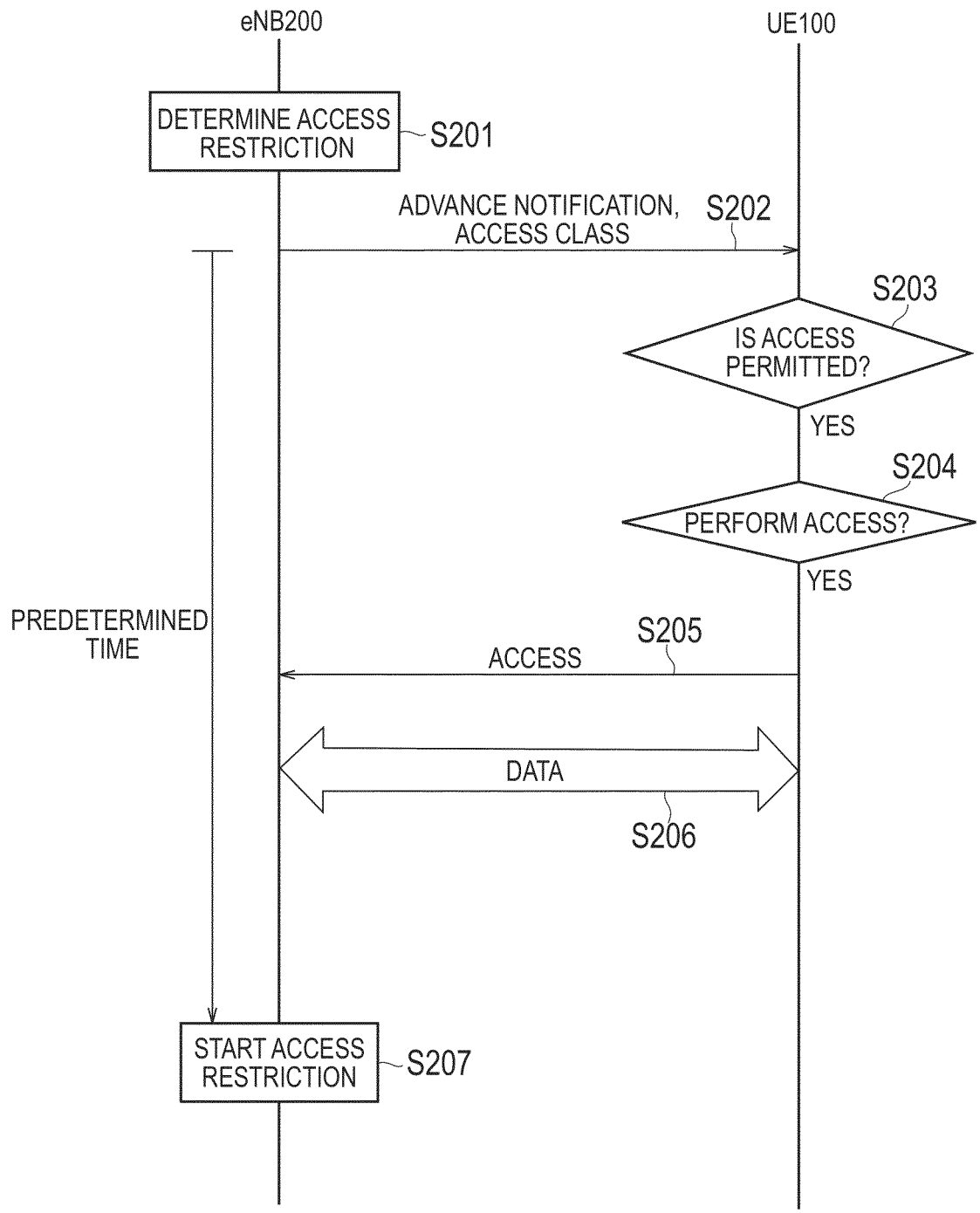
FIG. 15 is a diagram illustrating an example of an operation according to a third embodiment.

An example of the operation according to the third embodiment will be described. FIG. 15 is a diagram illustrating an example of an operation according to the third embodiment. A plurality of access classes is configured in the UE 100. A plurality of access classes may be preconfigured in the UE 100 in the manufacturing stage of the UE 100. A plurality of access classes may be configured in the UE 100 by mounting a nonvolatile storage medium (for example, UICC: universal integrated-circuit card) in which a plurality of access classes are stored in the UE 100. A network (eNB 200, MME 300 or the like) may configure a plurality of access classes in UE 100 through the use of signaling. The access class may be applied to access for special applications. The special applications include, for example, unmanned aircraft. Whether UE 100 applies the access class may be based on a contract for the special application, may be based on whether it has the capability of special application communication, may be based on whether it is going to perform special application communication, or may be based on whether it is going to perform communication in a special application situation (e.g. in flight).

As illustrated in FIG. 15, in step S201, the eNB 200 decides to perform the access restriction according to, for example, the current load of the eNB 200 being high or the load of the eNB 200 being expected to be high in the near future. The eNB 200 may decides an access class that allows access within a predetermined time before the access restriction is started.

In step S202, according to a decision to perform the access restriction, the eNB 200 broadcasts an advance notification indicating that the access restriction is to be started after a predetermined time. The advance notification may include time information indicating a time length of a predetermined time (for example, 100 seconds). Alternatively, the timer value corresponding to the predetermined time may be prescribed in the specification of the LTE system, and the timer value may be preconfigured in the UE 100. The eNB 200 may further broadcast access class information indicating a specific access class that permits access to the eNB 200 within a predetermined time. The specific access class is one or a plurality of access classes permitted by the eNB 200. The advance notification and the access class information may be included in the same SIB or may be included in different SIBs.

In step S203, the UE 100 receives access class information from the eNB 200, and when any of one or a plurality of the access classes configured in the UE 100 is a specific access class, the UE 100 determines that the UE 100 is permitted to access the eNB 200 within a predetermined time. On the other hand, when none of one or a plurality of access classes configured in UE 100 is a specific access class, the UE 100 determines that the UE 100 is not permitted to access the eNB 200 within a predetermined time.

When accessing eNB 200 within a predetermined time is permitted, in step S204, the UE 100 determines, based on the advance notification received from eNB 200, whether access to the eNB 200 should be performed within a predetermined time. As a determination criterion, any one of the following criteria 1) to 3) or a combination of two or more criteria can be used.

1) Whether the UE 100 can generate transmission data. For example, the UE 100 determines whether it can perform access immediately by controlling the application side and generating data a little ahead of schedule.

2) Allowable latency of transmission data. For example, when the UE 100 generates transmission data with small latency allowed for the transmission data, for example, the transmission data corresponding to an application with high immediacy, it determines that the access should be performed immediately.

3) Whether permission information, based on subscriber information, configured in advance exists in the UE 100. The permission information may include the access class described above.

When the UE 100 determines that access to the eNB 200 should be performed within a predetermined time, the process proceeds to step S205. Note that the order of step S203 and step S204 may be reversed.

In step S205, the UE 100 accesses the eNB 200. For example, the UE 100 performs an attach procedure to the network. The attach procedure may involve a random access procedure.

In step S206, the UE 100 transmits data to the eNB 200. The UE 100 may receive data from the eNB 200. When the data transmission/reception is completed, the UE 100 may be detached from the network (and release the RRC connection).

In step S207, the eNB 200 starts the access restriction when a predetermined time has elapsed since the advance notification was broadcast. When the access restriction is started, the eNB 200 rejects access from all the UEs 100. Alternatively, eNB 200 may reject access from the UEs 100 of some access classes, or may broadcast information specifying an access class for which access is prohibited.

Other Embodiments

In the above-described embodiments, the LTE system is exemplified as the mobile communication system. However, the present invention is not limited to the LTE system. The operation according to the above-described embodiments may be applied to a mobile communication system (for example, a fifth generation mobile communication system) other than the LTE system.

A program for causing a computer to execute each process performed by the UE 100 and the eNB 200 may be provided. The program may also be recorded on a computer readable medium. Use of a computer readable medium makes it possible to install a program in a computer. Here, the computer readable medium on which the program is recorded may be a non-transitory recording medium. The non-transitory recording medium is not particularly limited, but it may be a recording medium such as CD-ROM or DVD-ROM, for example. A chip set constituted by a memory storing a program for executing respective processes performed by the UE 100 and the eNB 200 and a processor executing the program stored in the memory may be provided.

The entire contents of Japanese Patent Application No. 2017-223366 (filed on Nov. 21, 2017) are incorporated herein by reference.

The invention claimed is:

1. A cell reselection control method used in a mobile communication system, the cell reselection control method comprising:
   transmitting from a base station configured to manage a cell belonging to a first frequency, to a radio terminal selecting the cell as a serving cell while being in an idle mode, an intra-frequency redistribution parameter for redistributing the radio terminal to another cell belonging to the first frequency, and an inter-frequency redistribution parameter for redistributing the radio terminal to at least one second frequency of multiple second frequencies different from the first frequency;
   receiving, by the radio terminal, the intra-frequency redistribution parameter and the inter-frequency redistribution parameter; and
   selecting, by the radio terminal, a redistribution target by using an identifier of the radio terminal and at least one of the intra-frequency redistribution parameter and the inter-frequency redistribution parameter, the redistribution target being a frequency or a cell provided with highest priority for cell reselection, wherein
   the selecting the redistribution target includes selecting the redistribution target by using the inter-frequency redistribution parameter with priority over the intra-frequency redistribution parameter,
   the intra-frequency redistribution parameter includes a parameter indicating a probability for each cell in the first frequency being selected as the redistribution target, and
   the inter-frequency redistribution parameter includes a parameter indicating a probability for each cell in the second frequency being selected as the redistribution target or a parameter indicating a probability for each second frequency being selected as the redistribution target.

2. The cell reselection control method according to claim 1, wherein the selecting the redistribution target includes:
   executing an inter-frequency redistribution procedure selecting the redistribution target by using the inter-frequency redistribution parameter; and
   executing an intra-frequency redistribution procedure selecting the redistribution target by using the intra-frequency redistribution parameter only when the inter-frequency redistribution procedure has ended in a failure.

3. The cell reselection control method according to claim 1, further comprising:
   transmitting, from the base station to the radio terminal, a notification indicating that selection of the redistribution target by using the intra-frequency redistribution parameter is permitted; and
   enabling selection of the redistribution target by using the intra-frequency redistribution parameter only when the radio terminal receives the notification.

4. The cell reselection control method according to claim 1, wherein
   the radio terminal is located in a coverage extended by an enhanced coverage function including repeated transmission, and
   the intra-frequency redistribution parameter is applied to the radio terminal located in the coverage extended by the enhanced coverage function.

5. A radio terminal used in a mobile communication system, the radio terminal comprising:
   a receiver configured to receive, from a base station configured to manage a cell belonging to a first frequency, an intra-frequency redistribution parameter and an inter-frequency redistribution parameter when the radio terminal is selecting the cell as a serving cell while being in an idle mode; and
   a controller configured to select a redistribution target by using an identifier of the radio terminal and at least one of the intra-frequency redistribution parameter and the inter-frequency redistribution parameter, the redistribution target being a frequency or a cell provided with highest priority for cell reselection, wherein
   the intra-frequency redistribution parameter is a parameter for redistributing the radio terminal to another cell belonging to the first frequency,
   the inter-frequency redistribution parameter is a parameter for redistributing the radio terminal to at least one second frequency of multiple second frequencies different from the first frequency,
   the controller is configured to select the redistribution target by using the inter-frequency redistribution parameter with priority over the intra-frequency redistribution parameter,
   the intra-frequency redistribution parameter includes a parameter indicating a probability for each cell in the first frequency being selected as the redistribution target, and
   the inter-frequency redistribution parameter includes a parameter indicating a probability for each cell in the second frequency being selected as the redistribution target or a parameter indicating a probability for each second frequency being selected as the redistribution target.

* * * * *